United States Patent [19]

Hall

[11] Patent Number: 4,727,558

[45] Date of Patent: Feb. 23, 1988

[54] METHOD AND APPARATUS FOR EXTRACTING A PREDETERMINED BIT PATTERN FROM A SERIAL BIT STREAM

[75] Inventor: Richard L. Hall, Dallas, Tex.

[73] Assignee: Dallas Semiconductor Corporation, Dallas, Tex.

[21] Appl. No.: 13,912

[22] Filed: Feb. 12, 1987

[51] Int. Cl.[4] ............................................. H04L 7/08
[52] U.S. Cl. ..................................... 375/116; 370/105
[58] Field of Search ................... 340/146.2; 370/100, 370/105, 106; 375/106, 111, 114, 116; 358/148

[56] References Cited

U.S. PATENT DOCUMENTS

| | | | |
|---|---|---|---|
| 4,316,284 | 2/1982 | Howson | 370/105 |
| 4,347,606 | 8/1982 | Hoogeveen | 370/105 |
| 4,622,666 | 11/1986 | Graves et al. | 370/105 |
| 4,646,328 | 2/1987 | Riou | 375/114 |

Primary Examiner—Benedict V. Safourek
Attorney, Agent, or Firm—Leonard & Lott

[57] ABSTRACT

An embedded framing bit pattern in a serial bit stream is located using a sliding compare circuit to determine as each bit of the serial bit stream is received if a predetermined number of prior bits of the serial bit stream which are spaced apart by the pitch of the framing bit pattern match part of the framing bit pattern. A candidate register containing one plus the number of bits between each framing bit is initially preset so that all of the bits are at a first logic state and is sequentially addressed as each bit of the serial bit stream is received. If a match does not occur, then the bit addressed in the candidate register is set to a second logic state, but is not disturbed if a match occurs. The framing bit pattern has been located when the candidate register is addressing the only bit position which is still at the first logic state.

5 Claims, 2 Drawing Figures

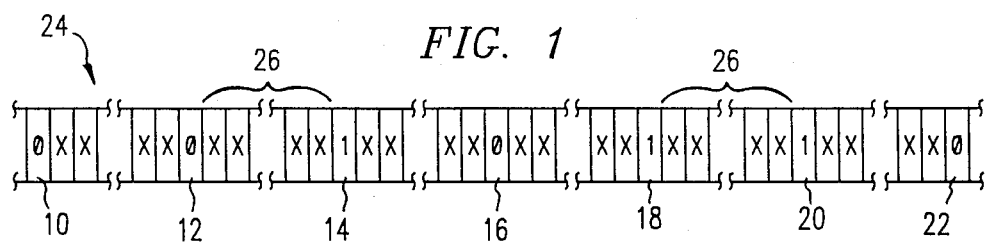
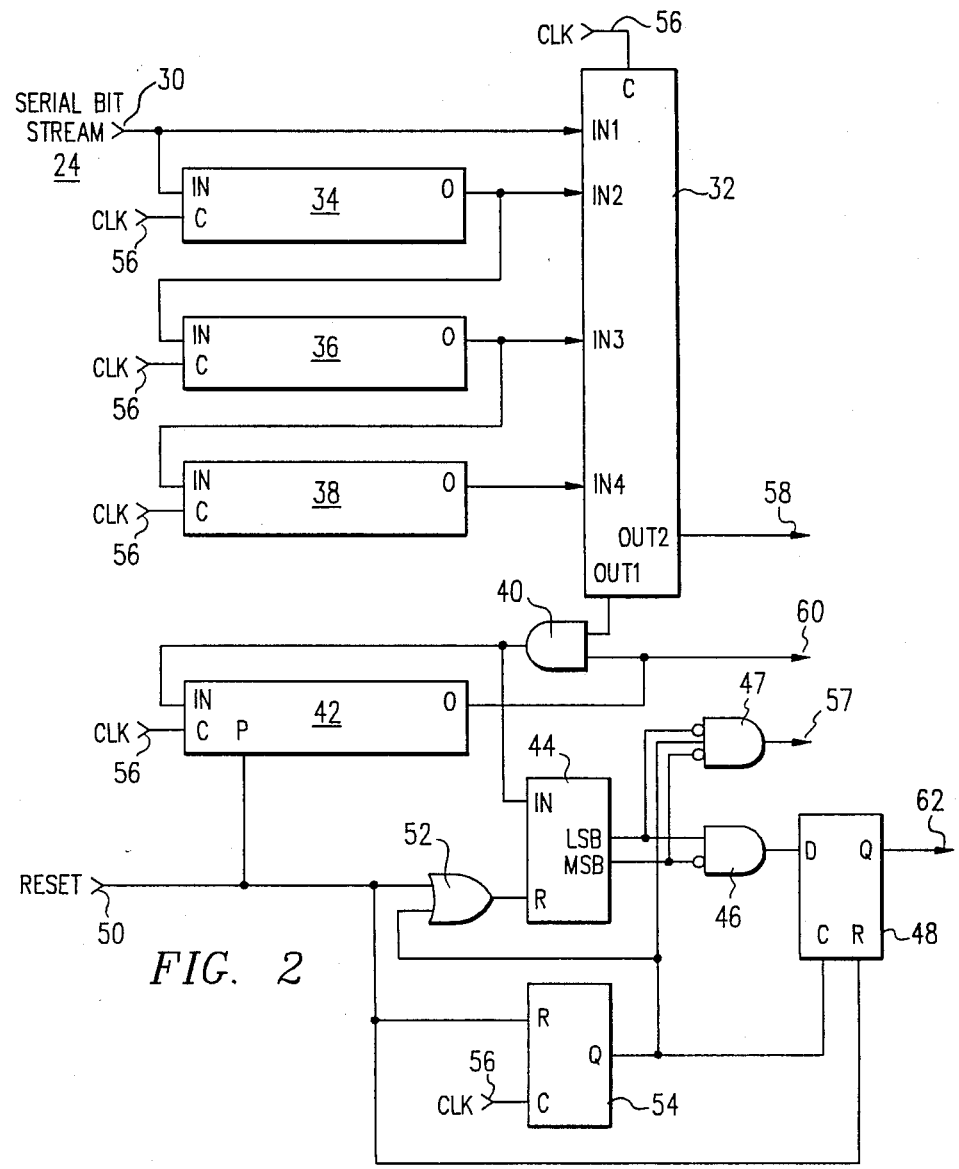

METHOD AND APPARATUS FOR EXTRACTING A PREDETERMINED BIT PATTERN FROM A SERIAL BIT STREAM

TECHNICAL FIELD

This invention relates to methods for processing serial bit streams of digital data, and more particularly to methods for extracting a predetermined bit pattern from a serial bit stream.

BACKGROUND OF THE INVENTION

Digital data transmission over a relatively long distance is usually transmitted over a single transmission channel in a serial bit stream format. In this format digital data, which usually uses eight, sixteen or thirty-two bits to represent a value or character, is transmitted serially, bit by bit, so that every eighth, sixteenth or thirty-second bit respectively is part of a new value or character.

An example of the use of serial data transmission is the transmission of telephone communications which have been digitized. Long distance transmission of digital telephone communications usually involve a process of combining or multiplexing many telephone calls onto one line. Several standards have been promulgated for such multiplexed telephone transmissions, one of which is referred to as the T1 standard. Telephone communications (data) is transmitted as a serial bit stream at 1.544 megabits/second.

A subset of the T1 standard is the ESF standard as described in AT&T Compatibility Bulletin No. 142, "The Enhanced Superframe Format Interface Specification" dated December, 1983. In the ESF standard, the data is divided into blocks of data of 193 bits each, and the first bit of each fourth block contains a predetermined framing bit. These framing bits are taken from the bit pattern 001011 so that the first framing bit is a 0 (zero) at the beginning of the fourth block, the second framing bit (at the beginning of the eighth block) is also a 0, the third framing bit (at the beginning of the 12th block) is a 1 (one), the fourth framing bit (at the beginning of the 16th block) is a 0, the fifth framing bit (at the beginning of the 20th block) is a 1, and the sixth framing bit (at the beginning of the 24th block) is a 1. Then the pattern repeats so that the framing bit at the start of the 28th, 32th, 36th, 40th, 44th and 48th block is 001011 respectively.

During transmission of data using the T1 standard, a separate clock signal is not transmitted; only the serial bit stream of data is transmitted. The receiver must determine where the boundaries of each individual bit occur in order to synthesize a clock signal which will be locked in phase with the serial bit stream. Once the bit timing has been established, the position of the framing bits needs to be established in order to synchronize the receiver with the transmitter. These framing bits are embedded into the data stream to enable the receiver to perform this synchronization since all of the other bits are essentially random data to the receiver synchronization circuit.

The synchronization process examines each bit of the incoming serial data to find out if the bit is part of the framing pattern. This must be repeated 4,632 bits later to see if the same pattern occurs since there is a finite probability that the first pattern was a random data pattern rather than the framing pattern. In practice this framing pattern is constantly checked in order to verify synchronization.

Of importance in the synchronization process is the speed at which the framing pattern is identified since data is not being properly decoded until the receiver is properly in synchronization with the transmitter. Also of importance, especially when the synchronization circuitry is embodied in an integrated circuit, is the amount of circuit space required for the synchronization. The amount of circuitry required directly affects the size of the integrated circuit (or portion of the integrated circuit) needed for the synchronization.

Therefore, it can be appreciated that a synchronization method which is relatively fast and that also uses a relatively small area on an integrated circuit is highly desirable.

SUMMARY OF THE INVENTION

It is therefore an object of this invention to provide a method for synchronizing a receiver with a serial bit stream containing embedded framing bits which is relatively fast and which uses a relatively small area on an integrated circuit.

As shown in an illustrated embodiment of the invention, a circuit for locating the position of an N bit framing pattern in a serial bit stream wherein each of said framing bits is separated by P-1 bits of data has a first register for storing (M-1) X P bits of the serial bit stream, where M is less than P. The first storage register also provides at M-1 output terminals the P, 2P, . . . (M-1)P previous bits of said serial bit stream. A second storage register has P storage locations and sequentially addresses each of these storage locations in synchronization with the arrival of the serial bit stream. All of the storage locations of the second storage register are initially set to a first logic state. A comparison circuit coupled to the first storage circuit and to the second storage register determines if the bit of said serial bit stream present at the input terminal in combination with the P, 2P, . . . (M-1)P previous bits of the serial bit stream match any M-bit sequences in length of the pattern formed by concatenating two of said framing bit patterns. The comparison circuit sets the storage location of the second storage register presently being addressed to a second logic state if a match does not occur and leaves undisturbed the data in the storage location presently being addressed if a match occurs. The last bit of the serial bit stream to have arrived is a framing bit if the storage location of the second storage register presently addressed is the only one of the storage locations of the second storage register which is presently at said first logic state.

Also shown in as illustrated embodiment of the invention, the location of the N framing bits of a framing bit pattern embedded in a serial bit stream can be determined by first writing a first logic state into all bits of a storage register which is equal in length to P, where P is equal to the number of bits between each framing bit plus one. Upon arrival of a bit from the serial bit stream, the bit is combined with the Pth previous bit, the 2×Pth previous bit, through the (M-1)×Pth previous bit where M is less than F. If the combination does not match any M-bit sequence of two framing bit patterns concatenated together, then a bit presently addressed in the storage register is set to a second logic state, and if there is such a match, the bit of the storage register is not disturbed. The bit addressed in the storage register is incremented for each new bit of the serial bit stream, and the combination and match process is repeated for the next arriving bit of the serial bit stream. Also, for every match that is found and for which the storage register presently being addressed is at the first logic state a counter is incremented. The state of the counter is checked after the arrival of every P bits and then reset. If the counter is zero when it is checked, the storage register is reset so that all of the bits of the storage register are preset to the first logic state. If the counter is one when it is checked, then the framing bits have been located.

BRIEF DESCRIPTION OF THE DRAWINGS

The aforementioned and other features, characteristics, advantages, and the invention in general, will be better understood from the following more detailed description taken in conjunction with the accompanying drawings in which:

FIG. 1 is a diagram of a serial bit stream showing the framing bit positions under the ESF standard; and FIG. 2 is a block diagram of a circuit for locating the position of the framing bits embedded in the serial bit stream of FIG. 1 according to the present invention.

DESCRIPTION OF THE PREFERRED EMBODIMENT

Turning now to the drawings, the location of the framing bits 10, 12, 14, 16, 18, 20 and 22 embedded in a serial bit stream 24 according to the ESF standard is shown diagrammatically in FIG. 1. Framing bits 10, 12, 14, 16, 18 and 20 form the pattern 001011. This pattern is then repeated with framing bit 22 being the first framing bit of the next framing bit pattern. Between each of the framing bits 10–22 are 771 data bits represented by element number 26. Thus a framing bit occurs once and only once in each group of 772 successive bits of serial data. While the ESF standard is being used in this discussion, it will be appreciated that other standards which use framing bits embedded in a serial data stream are also applicable to the present invention.

A circuit for locating the position of the framing bits embedded in the serial bit stream 24 of FIG. 1 is shown in FIG. 2. The serial bit stream 24 is received at an input terminal 30 which in turn is connected to a first input IN1 of a decoder circuit 32. Input terminal 30 is also connected to the input terminal IN of a first shift register 34. An output terminal O of the first shift register 34 is connected to a second input terminal IN2 of the decoder circuit 32. The O output terminal of shift register 34 is also connected to an input terminal IN of a second shift register 36, an output terminal O of which is connected to a third input terminal IN3 of the decoder circuit 32. The O output terminal of shift register 36 is also connected to an input terminal IN of a third shift register 38, an output terminal O of which is connected to a fourth input terminal IN4 of the decoder circuit 32.

A first output terminal OUT1 of the decoder circuit 32 is connected to one input of an AND gate 40, the output of which is connected to an input terminal IN of a fourth shift register 42. An output O of the shift register 42 is connected to the second input of the AND gate 40. The output of the AND gate 40 is also connected to an input IN of a noncycling counter circuit 44. An output LSB of the noncycling counter circuit 44 is connected to one input of another AND gate 46 and also to a first inverting input of another AND gate 47. Another output MSB of the noncycling counter circuit 44 is connected to an inverting input of the AND gate 46 and to a second inverting input of the AND gate 47. The output of the AND gate 46 is connected to an input D of a latch 48.

The circuit of FIG. 2 has a reset input terminal 50 for receiving a reset signal. Reset input terminal 50 is connected to a second input P of the shift register 42 and also to an input of an OR gate 52. Reset terminal 50 is also connected to an input R of a cycling counter 54 and to an input R of the latch 48. An output Q of the cycling counter 54 is connected to a second input of OR gate 52 and to another input C of latch 48. The Q output is also connected to a noninverting input of the AND gate 47. The circuit of FIG. 2 also has an input for receiving a clock signal CLK at node 56. The node 56 is also connected to the C input terminals of decoder circuit 32, the cycling counter 54, and shift registers 34, 36, 38 and 42.

The output of AND gate 47 is connected to an output terminal 57. An output OUT2 of decoder circuit 32 is connected to a second output terminal 58. The output O of shift register 42 is connected to a third output terminal 60. An output Q of latch 48 is connected to a fourth output terminal 62.

The circuit of FIG. 2 in accordance with the present invention locates the position of the embedded framing bits of a serial bit stream applied at the input terminal 30 and thereby enables a receiver (which the circuit of FIG. 2 is a part of in the preferred embodiment) to become synchronized with the serial bit stream. This process is performed in the following manner.

As each bit of the serial bit stream is received at input terminal 30, it is combined with the digital signals appearing at inputs IN4, IN3 and IN2 of decoder circuit 32, and the combination of the inputs IN4, IN3, IN2 and IN1 are decoded to determine if they match any sequence of two concatenated framing bit sequences. (For purposes of this description of the preferred embodiment it will be assumed that each of the shift registers 34, 36 and 38 is 772 bits long and contains a portion of the serial bit stream 24 at all times rather than all 1's or 0's or random data such as might be the case at the start of a synchronization process.) If a match is found, the output OUT1 of decoder 32 is set to a logical 1, and if no match is present, the output OUT1 is set to a logical 0. For example, if the serial bit stream input at input terminal 30 is the same as that shown in FIG. 1 (having the framing bit sequence 001011), the decoder circuit 32 will find a match if the combination of digital signals at inputs IN4, IN3, IN2 and IN1 respectively is any of the following: 0010, 0101, 1011, 0110, 1100 or 1001. These combinations are the six possible sequences of four bits in length of two concatenated framing bit patterns (i.e., 001011001011).

Circuitry for performing the match test function of the decoder circuit 32 are well known in the art and are omitted from FIG. 2 for simplicity. For example, the circuitry for performing the match test could consist of six AND gates having non-inverting and inverting inputs as appropriate to test for the six possible sequences set forth in the previous paragraph. The outputs of the six AND gates could be inputted to a six-input OR gate, and the output of the OR gate could be gated with the clock pulse from the C input to produce the OUT1 output of the decoder circuit 32.

As heretofore mentioned each of the shift registers 34, 36 and 38 is 772 bits long. Since the outputs of shift registers 34 and 36 are connected to the inputs of shift registers 36 and 38 respectively, the three shift registers 34, 36 and 38 can be regarded as a single 2,316 bit shift register with taps at the 772nd bit and the 1,544th bit. In effect, these three shift registers together with the decoder circuit 32 form a sliding compare circuit. The outputs from the three shift registers 34, 36 and 38 together with the most recent bit of the serial bit stream appearing at input terminal 30 form inputs IN1, IN2, IN3 and IN4 to the decoder circuit 32; these inputs provide samples of the serial bit stream 24 at bit intervals corresponding to the bit intervals of the framing bit pattern 10, 12, 14, 16, 18 and 20 embedded in the serial bit stream 24.

Shift register 42 is also 772 bits long but operates as a candidate register. At the beginning of a synchronization process of the present invention, a reset pulse is applied to the reset input terminal 50. This reset pulse, applied at the P input terminal of shift register 42 causes all of the bits of the shift register 42 to be preset to logical 1's. For each incoming bit of the bit stream 24, the OUT1 output of the decoder circuit 32 indicates whether the combination of sampled bits matches one of the six possible four-bit sequences of two framing bit patterns; the OUT1 output is a logical 1 each time there is a match and is a logical 0 otherwise. The OUT1 output of decoder circuit 32 is logically ANDed with the output O of shift register 42. Thus, shift register 42 is initially set to an all 1's condition for all of its 772 bits; but, whenever a non-match condition occurs in decoder circuit 32 for individual bits of the serial bit stream 24, the corresponding bit in the shift register 42 is set to a logical 0. This logical 0 condition remains for that particular bit until the shift register 42 receives another reset pulse at its P input terminal.

Shift register 42 thus stores a string of 772 bits which is synchronized with the data arriving from the serial bit stream 24. As previously stated, every group of 772 bits of the serial bit stream 24 contains one and only one framing bit. Moreover the framing bit occurs in the same bit position of every 772 consecutive samples of the serial bit stream 24. Thus, one particular bit of the serial register 42 represents the position of the framing bit of each consecutive group of 772 bits of the serial bit stream 24. In other words each time the bit representing the position of the framing bit appears at the output O of the shift register 42, the inputs IN1, IN2, IN3 and IN4 of the decoder circuit 32 are sampling four of the six framing bits of the serial bit stream 24. All other samples of the serial bit stream 24 are of data rather than of the framing bit pattern.

If the serial bit stream 24 contained all 1's or all 0's except for the framing bits, then after the first 772 bits arrived, there would have occurred only one match by the decoder circuit 32 during that time, and shift register 42 would have only one bit set to a logical 1, with all of the other bits set to a logical 0. However, in practice the data, other than the framing bit pattern, is essentially random for purposes of synchronization.

To determine when the shift register 42 contains one and only one bit set to a logical 1, the noncycling counter circuit 44 counts the number of logical 1's at the output O of the shift register 42. The noncycling counter 44 counts up from zero to three, but does not count above three or cycle back to zero. The zero state can be set only by resetting the counter with a logical 1 level applied to the input terminal R of the noncycling counter 44. The noncycling counter 44 is reset either by a reset command at reset terminal 50 or by a logical 1 output from counter circuit 54. This OR function occurs in OR gate 52. The LSB output of the noncycling counter 44 is connected to one input directly of the AND gate 46, while the MSB output of the noncycling counter 44 is connected to an inverting input of the AND gate 46. Thus a count of one produces a logical 1 signal at the output of AND gate 46 and to the input D of the latch 48, while a count of zero, two or three produces a logical 0 at the D input of latch 48.

The cycling counter 54 counts through 772 states and produces a logical 1 signal at its output terminal Q. This Q output is used to reset the noncycling counter 44 and also to transfer the state at the D input of latch 48 to the output Q of latch 48 each time the cycling counter 54 reaches a count of 772. In this manner the number of logical 1's in the shift register 42 is determined; and if the number of logical 1's is only one, then the Q output of latch 48 is set to a logical 1 indicating that the location of the framing bits within the serial bit stream 24 has been determined.

Once the location of the framing bit pattern has been determined, then the location of the first logical 0 of the framing bit pattern 001011 is determined by logically ANDing the output OUT2 of the decoder circuit 32 (node 58) with the O output of the shift register 42 (node 60). Output OUT2 of the decoder circuit 32 provides a logical 1 output when the inputs IN1, IN2, IN3 and IN4 are 0110. A logical 1 at output 60 indicates that the bit of the serial bit stream 24 presently at input terminal 30 is a framing bit, and a logical 1 at output terminal 58 indicates that if the bit at input terminal 30 is a framing bit, it is the first bit of the framing bit sequence 001011.

If the noncycling counter 44 is at the zero count (LSB and MSB outputs at a logical 0) when the Q output of counter 54 is at a logical 1, then the output of the AND gate 47 as well as the output terminal 57 will be at a logical 1. This condition can only occur if all of the bits of the shift register 42 are at a logical zero, which means that the shift register 42 has lost the location of the framing bit pattern. If this occurs, then the circuit must be reset (by circuitry not shown in FIG. 2) by applying a logical 1 signal on the reset input terminal 50 in order to preset the bits of the shift register 42 to the logical 1 state.

The clock signal CLK is the clock signal derived from the serial bit stream 24 by circuitry not shown in FIG. 2, but known in the art. This CLK signal is used to synchronize the shift registers 34, 36, 38 and 42, the decoder circuit 32 and the cycling counter 54 to the serial bit stream 24 present at the input terminal 30.

An advantage of the synchronization circuit of FIG. 2 compared to prior art circuits of this type is the use of only four shift registers of 772 bits each. Thus, by comparison to the use of more registers there is an advantageous savings of circuit area if the circuit is embodied in an integrated circuit. Moreover, the circuit of FIG. 2 performs the synchronization operation in approximately six to eight milliseconds compared to approximately 50 milliseconds or more required for some prior art circuits.

While the description above has been with respect to the ESF standard, it will be understood that the present invention is also applicable to other bit framing patterns differing in length and composition from the ESF standard. The present invention is also applicable to serial bit streams which have other than 772 data bits separating the framing bits and other than six framing bits in the framing bit pattern. If other than six framing bits are used in the pattern, the number of shift registers required to efficiently locate the framing sequence can be determined using an analysis similar to the analysis above. Also, the present invention is applicable to framing bit patterns which use framing packets of two or more bits in succession rather than a single framing bit separated by data bits as in the ESF standard.

Although the invention has been described in part by making detailed reference to a certain specific embodiment, such detail is intended to be and will be understood to be instructional rather than restrictive. It will be appreciated by those skilled in the art that many variations may be made in the structure and mode of operation without departing from the spirit and scope of the invention, as disclosed in the teachings contained herein. For example, instead of determining whether or not the framing pattern has been located by counting the number of 1 bits in the shift register 42, a timer could be used to time from the last reset pulse for a predetermined time interval which is sufficiently long to guarantee that only one bit of the shift register 42 is a logical 1.

What is claimed is:

1. A method for locating the position of an N bit framing pattern in a serial bit stream wherein each of said framing bits is separated by P-1 bits of data, said method comprising the steps of:
   (a) providing a storage device capable of writing and reading P bits of data in sequence;
   (b) providing a counter;
   (c) writing a first state into all P bits of said storage device and selecting a first bit to address;
   (d) resetting said counter to a base count position;
   (e) upon the arrival of a bit of said serial bit stream taking M samples $P_1, P_2, \ldots P_M$ of said serial bit stream where $P_1$ is the last bit to have arrived, $P_2$ is the bit of said serial bit stream which arrived P bits prior to said $P_1$ bit, and $P_M$ is the bit which arrived (M-1) X P bits prior to said $P_1$ bit, where M is less than N;
   (f) determining if the bit pattern sequence $P_M \ldots P_1$ matches any M-1 sequence of the bit pattern formed by concatenating two of said N bit framing patterns;
   (g) if a match occurs, then incrementing said counter, and if a match does not occur, writing a second state into the bit currently addressed in said storage device;
   (h) incrementing the address of said storage device;
   (i) repeating steps (e) through (h) for P-1 times; and
   (j) examining the state of said counter and repeating steps (c) through (j) if said counter is at said base count, repeating steps (d) through (j) if said counter has been incremented two or more times, and the position of said framing pattern having been located if said counter has been incremented only once.

2. A method for locating the position of the framing pattern in a T1 serial bit stream encoded according to the ESF standard comprising the steps of:
   (a) providing a storage device capable of writing and reading 772 bits of data in sequence;
   (b) providing a counter;
   (c) writing a first state into all 772 bits of said storage device and selecting a first bit to address;
   (d) resetting said counter to a base count position;
   (e) upon the arrival of a bit of said serial bit stream taking 4 samples $P_1, P_2, P_3$ and $P_4$ of said serial bit stream where $P_1$ is the last bit to have arrived, $P_2$ is the bit stream taking 4 samples $p_1, P_2, P_s$ and $P_4$, of said serial bit of said serial bit stream which arrived 772 bits prior to said $P_1$ bit, $P_3$ is the bit of said serial bit stream which arrived 772 bits prior to said $P_2$ bit, and $P_4$ is the bit which arrived 772 bits prior to said $P_3$ bit;
   (f) determining if the bit pattern sequence $P_4, P_3, P_2$ and $P_1$ matches the any of the bit sequences 0010, 0101, 1011, 0110, 1100 and 1001;
   (g) if a match occurs, then incrementing said counter, and if a match does not occur, writing a second state into the bit currently addressed in said storage device;
   (h) incrementing the address of said storage device;
   (i) repeating steps (e) through (h) for 771 times; and
   (j) examining the state of said counter and repeating steps (c) through (j) if said counter is at said base count, repeating steps (d) through (j) if said counter has been incremented two or more times, and the position of said framing pattern having been located if said counter has been incremented only once.

3. Apparatus for locating the position of an N bit framing pattern in a serial bit stream wherein each of said framing bits is separated by P-1 bits of data, comprising:
   (a) first input terminal for receiving said serial bit stream;
   (b) first storage means for storing (M-1) X P bits of said serial bit stream coupled to said input terminal, where M is less than P and for providing at M-1 output terminals of said first storage means outputs constituting the P, 2P, ... (M-1)P previous bits of said serial bit stream;
   (c) second storage means for storing binary numbers in P storage locations and for sequentially addressing each of said storage locations in synchronization with the arrival of said serial bit stream at said first input terminal, all of said storage locations of said second storage means being initially set to a first logic state; and
   (d) comparison means coupled to said first storage means and to said second storage means for determining if the bit of said serial bit stream present at said input terminal in combination with the P, 2P, ... (M-1)P previous bits of said serial bit stream match any M sequences of the pattern formed by concatenating two of said framing bit patterns and for setting the storage location of said second storage means presently being addressed to a second logic state if a match does not occur and leaving undisturbed said storage location presently being addressed if a match occurs, the bit of said serial bit stream presently at said input terminal being a framing bit if the storage location of said second storage means presently addressed is the only one of said storage locations of said second storage means which is presently at said first logic state.

4. The apparatus as set forth in claim 4 wherein said comparison means includes means for counting the number of storage locations in said second storage means which are at said first logic state for P bit sequences of said serial bit stream.

5. Apparatus for locating the position of the framing bits in a serial bit stream formed according to the ESF standard, comprising:
   (a) an input terminal for receiving said serial bit stream;

(b) a 2,316 bit shift register coupled to said input terminal and clocked in synchronization with said serial bit stream such that said serial bit stream passes through said shift register, said shift register having first, second and third outputs at the 772nd, 1,544th and 2,316th bit positions respectively:

(c) a decoder circuit coupled to said 2,316 bit shift register for determining if the bit present at said third output, said second output, said first output and said input terminal respectively match any of the bit patterns 0010, 0101, 1011, 0110, 1100 and 1001;

(d) a 772 bit shift register coupled to said decoder circuit in which all bits of said 772 bit shift register are initially set to a first logic state and in which the bits recirculate through said 772 bit shift register in synchronization, and in which the bit at a single location is set to a second logic state if a match does not occur in said decoder circuit, the bit of said serial bit stream presently at said input terminal being a framing bit if the bit at said single location is the only one of said storage locations of said 772 bit shift register which is at said first logic state.

* * * * *

UNITED STATES PATENT AND TRADEMARK OFFICE
CERTIFICATE OF CORRECTION

PATENT NO. : 4,727,558
DATED : February 23, 1988
INVENTOR(S) : Hall

It is certified that error appears in the above-identified patent and that said Letters Patent is hereby corrected as shown below:

Column 7, line 41, please change "M-1 sequence" to --M-bit sequence--.

Column 8, line 54, please change "being a" to --being identified as a--; line 59, please change "in claim 4" to --in claim 3,--.

Signed and Sealed this

Thirteenth Day of June, 1989

*Attest:*

DONALD J. QUIGG

*Attesting Officer*  *Commissioner of Patents and Trademarks*